(12) United States Patent
Hilbert et al.

(10) Patent No.: US 6,377,714 B1
(45) Date of Patent: Apr. 23, 2002

(54) METHOD FOR ARCHIVING MASTER IMAGES BY DIGITAL IMAGE DATA PROCESSING

(75) Inventors: Stefan Hilbert, Zeuthen; Ralf Reulke, Wildau; Hans Driescher; Andreas Eckardt, both of Berlin; Martin Scheele, Brieselang; Reinhard Schuster, Kleinmachnow; Thomas Terzibaschian, Berlin, all of (DE)

(73) Assignee: Deutsches Zentrum für Luft-und Raumfahrt e.V., Bonn (DE)

( * ) Notice: Subject to any disclaimer, the term of this patent is extended or adjusted under 35 U.S.C. 154(b) by 0 days.

(21) Appl. No.: 09/331,129

(22) PCT Filed: Dec. 12, 1997

(86) PCT No.: PCT/EP97/06977

§ 371 Date: Jun. 14, 1999

§ 102(e) Date: Jun. 14, 1999

(87) PCT Pub. No.: WO98/26579

PCT Pub. Date: Jun. 18, 1998

(30) Foreign Application Priority Data

Dec. 13, 1996 (DE) .......................................... 196 53 742
Dec. 13, 1996 (DE) .......................................... 196 53 740
Dec. 13, 1996 (DE) .......................................... 196 53 671

(51) Int. Cl.⁷ ................................................. G06K 7/00

(52) U.S. Cl. ..................... 382/312; 382/298; 382/305; 358/403; 358/451

(58) Field of Search .................... 382/312, 319–324, 382/305, 298–301; 358/487, 482, 449, 403, 434, 483, 506, 406, 474; 355/18, 53, 55–56; 345/835, 839, 966; 250/226, 208.1, 234; 348/108, 112, 79, 96

(56) References Cited

U.S. PATENT DOCUMENTS

| 4,974,068 A | 11/1990 | Hiramatsu et al. .......... 358/506 |
| 5,124,810 A | * 6/1992 | Seto ............................ 358/406 |
| 5,311,326 A | 5/1994 | Katsuragi .................... 358/434 |

(List continued on next page.)

FOREIGN PATENT DOCUMENTS

| DE | 33 11 898 | 10/1984 | ............ H04N/5/21 |
| DE | 4016954 | 11/1990 | ............ H04N/1/04 |
| DE | 4409283 | 9/1995 | ............ H04N/5/21 |

(List continued on next page.)

OTHER PUBLICATIONS

Article by Jähne Bernd entitled "Digitale Bildverarbeitung", 1991, Springer Verlag, pp. 41–49.

Article by Wolfram H.H.J. Lunscher, et al. entitled "Optimal Edge Detector Design I: Parameter Selection and Noise Effects" published in IEEE Transaction on Pattern Analysis and Machine Intelligence, vol. PAMI-8, No. 2, dated Mar. 1986.

*Primary Examiner*—Leo Boudreau
*Assistant Examiner*—Ishrat Sherali
(74) *Attorney, Agent, or Firm*—Cohen, Pontani, Lieberman & Pavane

(57) ABSTRACT

A method for archiving a master image, including the steps of pre-detecting a resolution of a master image which is at least one of a geometric, a radiometric and a spectral resolution, adaptively matching a resolution of an optical device to the pre-detected master image resolution such that the optical device resolution conforms with minimum resolution for an appropriate scanning theorem, scanning point values of the master image with the resolution from the matching step by the optical device having a photosensitive component, digitizing the point values of the master image from the scanning step, compressing the digitized point values, and storing the compressed point values.

13 Claims, 3 Drawing Sheets

U.S. PATENT DOCUMENTS

| | | | |
|---|---|---|---|
| 5,461,491 A | 10/1995 | Degi | 358/482 |
| 5,483,053 A * | 1/1996 | Johnson et al. | 250/226 |
| 5,574,577 A * | 11/1996 | Wally, Jr. et al. | 358/487 |
| 5,706,457 A * | 1/1998 | Dwyer et al. | 345/835 |
| 6,252,998 B1 * | 6/2001 | Tsai | 382/298 |
| 6,320,641 B1 * | 11/2001 | Bauer et al. | 355/18 |

FOREIGN PATENT DOCUMENTS

| | | | |
|---|---|---|---|
| EP | 440 230 | 8/1991 | H04N/3/36 |
| GB | 2 286 941 | 8/1995 | H04N/1/140 |
| JP | 63 127 667 | 5/1988 | H04N/1/387 |
| JP | 5-63912 | 3/1993 | H04N/1/04 |
| JP | 8-18751 | 1/1996 | H04N/1/19 |
| WO | WO 92/22141 | 12/1992 | H03M/7/30 |
| WO | WO 95/28052 | 10/1995 | H04N/1/00 |

* cited by examiner

METHOD FOR ARCHIVING MASTER IMAGES BY DIGITAL IMAGE DATA PROCESSING

BACKGROUND OF THE INVENTION

The invention relates to a method for the archiving of master images, in particular of films, in which the master image is scanned and the detected image points are digitized, corrected and compressed, and to a device for carrying out the method.

Due to the finite durability of celluloid films and their complicated storage, there has long been a need for the image information to be archived simply-and permanently. There have also been many and various efforts to store the master images on other media.

The theoretical preconditions for loss-free digitization have long been known from telecommunication and information technology. It is necessary, for this purpose, to conform to Shannon's scanning theorem which states that scanning must be carried out at a scanning frequency at least twice as high as the highest signal frequency occurring, in order to avoid loss of information. Similar considerations also apply to the digitization of master images (Jähne, Bernd: Digitale Bildverarbeitung [Digital Image Processing], second edition 1991, Springer Verlag Berlin, pages 41–49). There is no appreciable problem in conforming to the scanning theorem in telecommunication and information technology, since the bandwidth of the useful signal is predetermined. In the case of master images, however, the resolution is usually not already known, so that there are considerable practical difficulties in conforming to the scanning theorem. If, by contrast, the master image is simply scanned with the maximum possible resolution in technical terms, the incidence of data is so great that, on the one hand, digitization takes up an inconceivable amount of time and, on the other hand, the storage space required becomes immense. As regards master images, therefore, the scanning theorem, in the widest sense, plays a part only if information on the master image is available beforehand.

With regard to the problems caused by the incidence of data, reference is made, for example, to WO 92/22 141, which discloses a data compression device having a hierarchical design. Here, a multiplicity of microprocessors are arranged at different levels, in each case the microprocessor of the higher level transmitting only some of the data to be compressed, so that, in particular, data records changing only little from master image to master image can be processed rapidly. Disadvantages of the known device are, besides the fact that loss-free archiving is not possible, the highly complicated design and the low speed of processing of rapidly changing master images.

JP 5-63912 A discloses a device for the digitization of master documents, in which digitization is carried out at a specific scanning rate. By means of the binary structure of the master document, aliasing effects can then be inferred relatively simply from the subscanning and the resolution can be increased until the aliasing effects have disappeared. In the case of more complex master images without previous information, such a procedure is ruled out, since the aliasing effects cannot be detected reliably.

In practice, therefore, a different technical direction has been adopted as regards master films, specifically optimized adaption to the reproduction medium at the expense of a loss of data.

EP 0,440,230 discloses, for example, a device, by means of which the image information of a cinema film is converted into a video signal for television. In this case, mechanical faults in the master image are also taken over. Specific faults are then subsequently detected during playback and are suppressed. Methods of this kind are known, for example, from DE 33 11 898 or DE 44 09 283. A disadvantage of this and of similar procedures is that conversion is tailored to television as the future medium, so that image information is lost from the master image during conversion. If the master image is subsequently destroyed, these faults can scarcely, or cannot at all, be reconstructed any more, so that the original master image can no longer be generated in full from the archive data.

SUMMARY OF THE INVENTION

The technical problem on which the invention is based is, therefore, to provide a method, and a device for carrying out the method, for the archiving of master images, in particular of films, so as to be free of loss.

Since the geometric and/or radiometric and/or spectral resolution of the respective master image is predetermined or previously detected and the respective resolution of the optical device is subsequently matched adaptively to the predetermined or previously detected respective resolution of the master image, in such a way that the master image is scanned with a resolution at least twice as high, it is possible for the master image to be scanned without any loss of information, and with pseudodata being avoided. This reduces both the time required for the scanning operation and the quantity of data to be stored. The partly cumulative and partly alternative formulation results from the fact that all the respective scanning theorems must actually be conformed to, in order to ensure loss-free archiving. It may also be envisaged, however, to have master images in which the infringement of one or more scanning theorems can be accepted without any loss of information. For example, in the case of master documents having a binary structure, the spectral and radiometric distribution may not be of any further use, so that corresponding adaptive matching is unnecessary. Moreover, instances may also be envisaged, in which adaptive matching of an individual resolution is unnecessary, without a substantial increase in the data quantity occurring. This may be the case, for example, when information is available beforehand, so that, if the resolution is permanently set, the scanning theorem is reliably conformed to, without the excess pseudodata assuming major importance. Further advantageous refinements can be gathered from the subclaims.

In this case, the maximum geometric resolution can be detected, for example, either from the autocorrelation function of the gray values or from the spectral distribution of the spatial frequencies with determination of the limit values.

In this case, the adaptive matching of the geometric resolution of the optical device may be carried out, for example, via macropixel formation of the photosensitive component and/or defocusing and/or compression. For the adaptive matching of the spectral resolution, the spectral sensitivity of the photosensitive component and/or the spectral luminous intensity of the radiation source may be modified. For the adaptive matching of the radiometric resolution, the amplification of the photosensitive component and/or the integration time and/or the irradiation intensity of the radiation source may be modified.

Advantageously, the photosensitive component is measured and correction values are determined, by means of which, for example, inhomogeneities of the radiation source, the edge decline of imaging optics and the sensitivity fluctuations of the photosensitive component itself can be corrected.

In order further to reduce the incidence of data, before data compression mechanical faults and/or other defects in the master image are detected and are corrected by means of adjacent image points and/or preceding and/or following master images or ignored. For example, a local deviation of the point spread function (PSF) with respect to the remaining master image may be utilized for detecting the edge of the mechanical faults in the master image and/or in the sound track of a master film, in which case aliasing effects are to be ruled out. In this case, the PSF of the remaining master image is predetermined on the basis of the known recording technique and the material of the master image. If, for example, there is a tear in a master image of a film sequence, the known methods would interpret this as a pronounced change from master image to master image and would store correspondingly large data quantities. By contrast, in the method according to the invention, this fault is detected and, where appropriate, is corrected or ignored. Tears and kinks do not necessarily have to result in an absence of image information, but take the form of an additional line which is merely to be ignored. In order to correct defects, various methods may be envisaged, which, if appropriate, can also be used in combination. On the one hand, the absence of image content may be inferred from the vicinity of the defect by means of suitable signal processing algorithms, the entire content of an image and all the image points in each case adjacent to the defect being analyzed. On the other hand, the absence of image content may be inferred from a comparison with preceding and following master images, since the occurrence of specific defects, for example due to the influence of microorganisms, with the same geometry in successive master images is highly unlikely. In the case of image sequences with a rapidly changing image content, so-called movement vectors must additionally be determined in order to carry out this correcting method.

Moreover, there may be provision for plotting the detected image points spectrally and radiometrically by means of correcting curves, the correcting curves compensating, in particular, material parameters and aging processes of the master image. Furthermore, blurring of the master image can be eliminated by a correction of the point spread function. The advantage of this is that the quality of the master image is returned to its original state, so that subsequent complicated reconstructions become superfluous. Moreover, the image quality can even be improved, as compared with the master image, in that blurring of the original can be corrected by the correction of the PSF, this being possible, for example, from a knowledge of the camera design and of the objective and/or filter used in the original recording of the master image.

BRIEF DESCRIPTION OF THE DRAWINGS

The invention is explained in more detail below with reference to a preferred exemplary embodiment. Of the Figures.

DETAILED DESCRIPTION OF THE PREFERRED EMBODIMENTS

Figure 1:
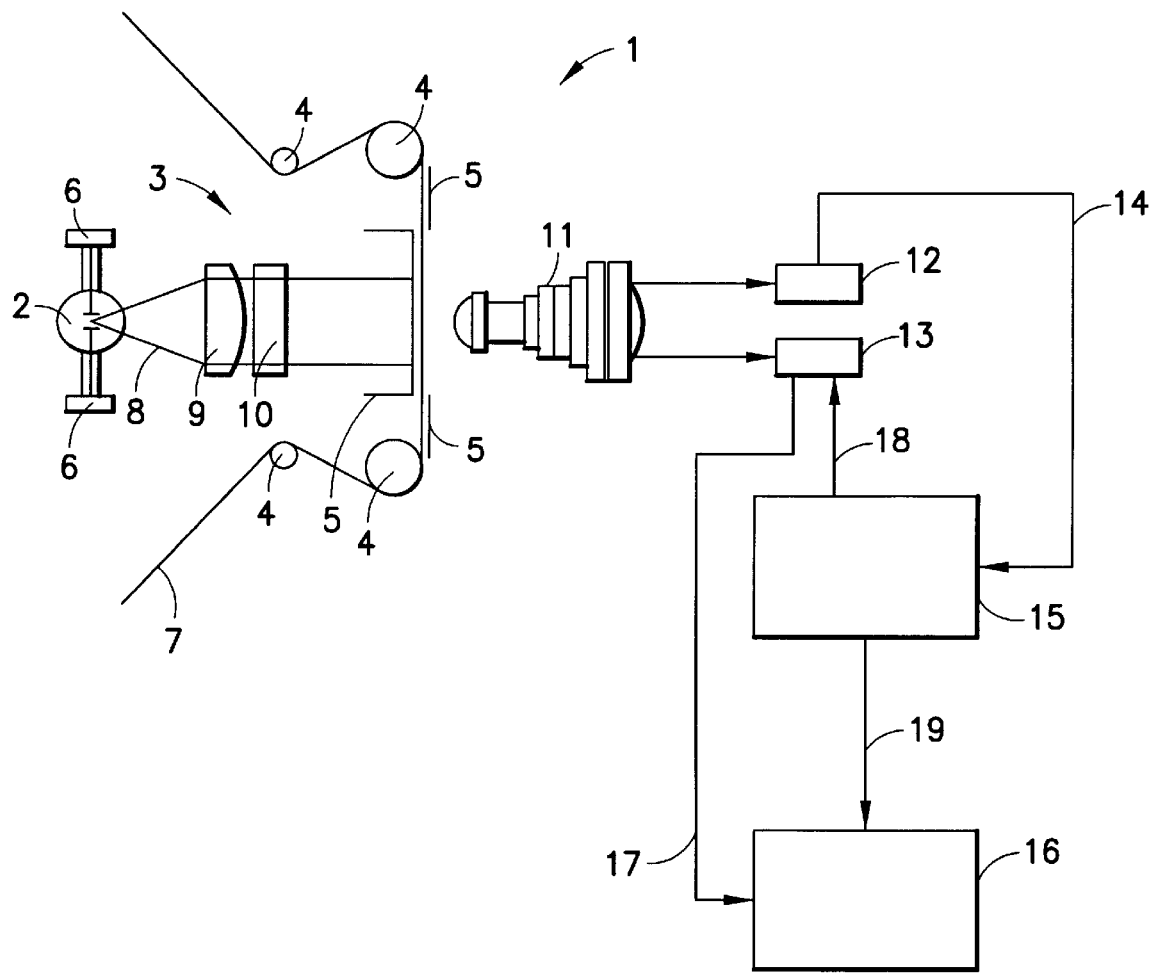
FIG. 1 shows a diagrammatic illustration of the device for the geometric and radiometric scanning of a master image.

The device 1 comprises a light source 2, imaging optics 3, a plurality of transport rollers 4 and guides 5. The light source 2 has a variable radiation capacity and can be arranged at a fixed location via a fastening means 6. A film 7 is moved continuously or discontinuously via the transport rollers 4. At the same time, the radiation 8 emitted by the light source 2 is imaged, via the imaging optics 3, onto a selected master image of the film 7, at least part of the guide which faces the light source being of transparent design. The imaging optics 3 comprise a lens 9 and a collimator 10, in order to irradiate the master image in as parallel a manner as possible. Arranged on the side of the master image located opposite the light source 2 are further imaging optics 11 which image the radiation 8 irradiating the master image onto a prefield sensor 12 and a main sensor 13. The data output of the prefield sensor 12 is connected to the data inputs of control electronics 15 via a databus 14. The data output of the main sensor 13 is connected to the data inputs of a store 16 via a databus 17. The control electronics 15 are connected with their control outputs to the control inputs of the main sensor 13 via a connection 18 and are connected to the control inputs and data inputs of the store 16 via a connection 19.

The method for optimally setting the geometric resolution is explained in more detail below. In a first method step, the resolution of the master image is detected by the prefield sensor 12. For this purpose, for example, the autocorrelation function of the gray values or the spectral distribution of the spatial frequency with determination of the limit values is detected and adaption of the resolution of the main sensor 13 is carried out via the control electronics 15. In this case, the resolution of the main sensor 13 is selected to be just such that the scanning theorem is still conformed to. Since the resolution of a film may be a parameter which is virtually constant over the entire film, this method step may be carried out in the archiving prefield and does not need to be determined separately for each master image. The resolution of the prefield sensor 12 and of the main sensor 13 can be adapted in various ways. If, for example, a CCD matrix or a CCD row is used as the prefield sensor 12 and the main sensor 13, adjacent CCD elements are combined into macropixel formats, so that the obtainable resolution can be adapted accordingly. Since the available CCD components have a resolution higher by a multiple than the master images to be archived, a sufficiently accurate setting of the resolution can be achieved even in the case of a discrete combination of adjacent CCD elements. The imaging optics 3 arranged between the light source 2 and the prefield sensor Z 12 or the main sensor 13 must also be taken into account in adapting the resolution. Moreover, the prefield sensor 12 detects the geometric position and the geometric dimensions of the master image, and, if appropriate, further additional information of the master image, such as, for example, its radiometric distribution, this being explained in more detail below. If, then, the master image is moved further by means of the transport rollers 4, the master image previously detected by the prefield sensor 12 is then imaged onto the main sensor 13. The main sensor then scans the master image image point by image point with the resolution determined by the prefield sensor 12. The data detected by the prefield sensor 12 or main sensor 13 are then transferred to the store 16 via the control electronics 15 or directly via the databus 17.

Data compression can then take place in a separate method step, in that the digitized data are read out from the store 16 and compressed by means of known data compression algorithms on an EDP system and are transmitted to a mass data store. Compression may also take place before filing in the store 16, so that this separate method step is dispensed with, this being explained in more detail later with reference to FIG. 3.

For the radiometric scanning of a film 7, the device 1 is adjusted before the film is inserted. For this purpose, the light source 2 is switched on and the prefield sensor 12 and the main sensor 13 are activated with a specific amplification, the activation of the prefield sensor 12 not being illustrated. The radiation capacity of the light source 2 and/or the amplification of the prefield sensor 12 and of the main sensor 13 are then set in such a way that the main sensor 13 and prefield sensor 12 are still activated just below full modulation. The purpose of this is subsequently to utilize the full dynamic range of the main sensor 13 and prefield sensor 12. After adjustment, the radiation capacity of the light source 2 is kept constant.

Figure 2:
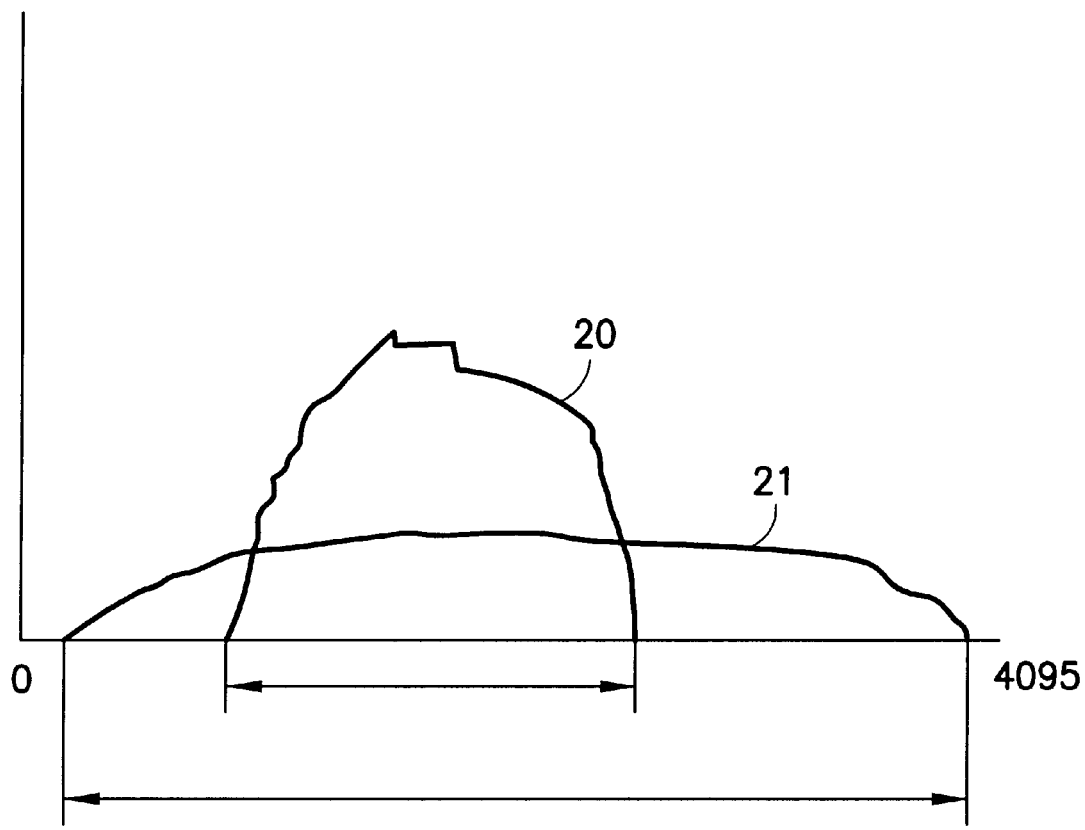
FIG. 2 shows a diagrammatic illustration of the recorded and changed radiometric distribution of the master image.

The film 7 is subsequently inserted into the device 1 and is wound forward until the first image is present between the guides 5. The master image is irradiated by the radiation 8 of the light source 2, the transmission ratio being variable from image point to image point. The transmitted radiation 8 is imaged onto the prefield sensor 12 by the imaging optics 11. The prefield sensor 12 scans the master image from image point to image point and detects the radiometric value of each image point. The scanning operation may be carried out in various ways. On the one hand, the prefield sensor 12 may be designed as a matrix-shaped photosensor array (for example, a CCD array), onto which the master image is imaged in full. On the other hand, it is also possible to produce a scanning effect by movement of the imaging optics 11 and/or of the prefield sensor 12. This is necessary, for example, when a linear photosensor is used. After scanning, the radiometric distribution of the master image is thus known. The radiometric values detected by the prefield sensor 12 are transferred to the control electronics 15 via the databus 14. On the basis of the detected minimum and maximum values, the integration time and/or the amplification of the main sensor 13 is selected or calculated by the control electronics 15 in such a way that the full dynamic range of the main sensor 13 is utilized. In this case, however, the amplification of the main sensor 13 must also be selected in such a way that an A/D converter integrated into the control electronics 15 is not saturated. In order to utilize the full dynamic range of the main sensor 13, the minimum radiometric values are displaced toward dark current noise and the maximum radiometric values are displaced in the direction of full modulation. The main sensor 13 then scans the master image once again and transfers the detected values to the store 16 via the databus 17. The respective address is transferred to the store 16 via the connection 19, as well as the values for the integration time and/or amplification used in this case and the minimum and maximum detected radiometric value of the prefield sensor 12. If required, the radiometric values originally detected by the prefield sensor 12 may then be recalculated again from the stored radiometric values or said radiometric values can be suitably manipulated, so that radiometric information hidden in the master image can be evaluated. Furthermore, the recorded radiometric distribution can also be compressed, and this will be explained in more detail by means of the example in FIG. 2. FIG. 2 illustrates the radiometric values graphically in the form of a histogram. The radiometric values in the case of, for example, 12-bit resolution are plotted on the X-axis and the number of detected image points having a specific radiometric value are plotted on the Y-axis. Here, the curve 20 illustrates the radiometric distribution of the master image detected by the prefield sensor 12, whereas the curve 21 illustrates the displaced radiometric distribution detected by the main sensor 13. The actual information content of the radiometric distribution according to curve 20 comprises, for example, only $2^7$ different radiometric values, unless hidden information has been found by stretching. The radiometric distribution according to curve 20 may therefore also be stored as a 7-bit data item, although displacement to the coordinate origin must be included as a parameter, so that an inference can be made again as to the actual distribution. Particularly in the case of master images with a narrow-band radiometric distribution, such as, for example, a night exposure, considerable data reductions are thereby possible. The prefield sensor 12 and the main sensor 13 may operate both in parallel and in series. The term "parallel" is intended to mean that the prefield sensor 12 is arranged or activated in such a way that it is always already scanning the next image, while the main sensor 13 is taking into account the new radiometric distribution of the preceding image. If the prefield sensor 12 detects a radiometric distribution which already covers its entire dynamic range, the integration time and amplification for the main sensor 13 are not changed. For the full utilization of the dynamic range, it is necessary to ensure that the noise does not exceed the lowest dynamizing stage of the dynamic range used in each case. It must also be remembered that most photosensitive components which can be used, such as, for example, CCD arrays, are temperature-dependent in their sensitivity and their noise behavior. It is therefore advantageous to provide temperature stabilization for the prefield sensor 12 and the main sensor 13. It should be noted, moreover, that a plurality of the devices may be arranged in parallel, in order thereby to increase even further the processing time which can be achieved.

Figure 3:
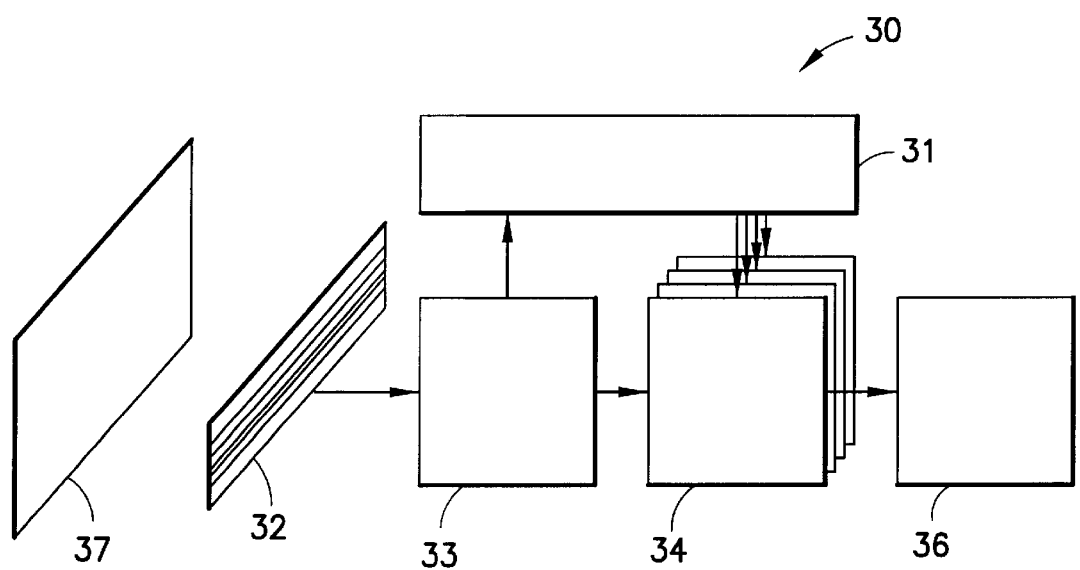
FIG. 3 shows a block diagram of a device for the correction of mechanical faults and/or other defects in the master image.

FIG. 3 illustrates a device 30 for the correction of defects. The device 30 is conventionally an integral part of the device 1, but is illustrated separately, here, for the sake of clarity, the individual constituents also being assigned new reference symbols. In FIG. 2, the device would be arranged essentially at the location of the store 16.

The device 30 comprises a spectral-sensitive and photosensitive component 32, signal electronics 33, an intermediate store 34, a signal processor 35 and a mass data store 36. A master image 37 to be stored is irradiated, for example, by a light source which is not illustrated. The radiation transmitting the master image 37 is detected by the spectral-sensitive and photosensitive component 32. The spectral-sensitive and photosensitive component 32 is designed, for example, as a linear RGB (Red-Green-Blue) CCD element which scans the master image 37 linearly. The detected data are read out by the signal electronics 33, amplified and digitized. The digitized data of the master image 37 are subsequently filed in the intermediate store 33 so as to be capable of being assigned uniquely to a respective image point. The signal electronics 33 at the same time transmit the digitized data to the signal processor 35. In the signal processor 35, the data are examined for mechanical faults, such as, for example, tears, stripes in the film running direction (scratches), breaks in the celluloid layer, by means of an electronic filter algorithm which operates on the principle of edge detection. When such a mechanical fault is found, the signal processor 35 manipulates according to the associated data in the intermediate store 34. The data are additionally examined for further defects in the signal processor 35. For this purpose, for example, the defect is compared with adjacent image points. If, for example, the defect produces a black spot in an otherwise blue sky in the master image 37, the defect can be completed by an adjacent image point or by averaging said defect. Alternatively or cumulatively, the master image 37 to be processed can be compared with a preceding and a following master image 37. Further, radiometric and spectral correcting curves can be filed in the signal processor 35 and then used to plot the data in the intermediate store 34. Since the spectral and radiometric variations in the master image 37 due to aging processes or the like for a celluloid film are virtually constant over the entire film, the correcting curves can be determined once only at the start of the scan. The data ultimately filed in the intermediate store 34 are subsequently compressed conventionally and filed in the mass data store 36.

What is claimed is:

1. A method for archiving a master image, comprising the steps of:

pre-detecting a resolution of a master image which is at least one of a geometric, a radiometric and a spectral resolution;

adaptively matching a resolution of an optical device to the pre-detected master image resolution such that the optical device resolution conforms with minimum resolution for an appropriate scanning theorem;

scanning point values of the master image with the resolution from the matching step by means of the optical device having a photosensitive component;

digitizing the point values of the master image from the scanning step;

compressing the digitized point values, and storing the compressed point values.

2. The method as claimed in 1, wherein the pre-detecting step includes predetermining a maximum geometric master image resolution by detecting at least one of:

an autocorrelation function of gray values, and a spectral distribution of spatial frequencies with limit values.

3. The method as in claim 1, wherein the adaptive matching step includes at least one of:

macropixelly forming a photosensitive component, defocusing, and compressing.

4. The method as in claim 1, wherein the adaptive matching step includes at least one of:

adjusting a spectral sensitivity of the photosensitive component; and changing a spectral luminous intensity of a radiation source.

5. The method as in claim 1, wherein the adaptive matching step includes at least one of:

amplifying the photosensitive component, amplifying an integration time, and amplifying an irradiation intensity.

6. The method as in claim 1, wherein the pre-detecting step includes:

predetermining parameters of the master image, at least one of the parameters being one of geometric, radiometric, and spectral; and taking into account the parameters while at least one of scanning, digitizing, and compressing.

7. The method of claim 6, wherein the predetermining parameters include at least one of dimensions, positions, a dynamic range of radiometric resolution, and an aging phenomena.

8. The method as in claim 1, further comprising:

measuring geometric and spectral properties of the photosensitive component;

determining correcting curves; and correcting the master image using the correcting curves.

9. The method as in claim 1, further comprising, subsequent to digitizing the master image, the steps of:

detecting at least one of mechanical faults and other defects in the master image and one of ignoring the detected mechanical faults and other defects, and correcting the mechanical faults and other defects using one of adjacent image points, preceding master images, and following master images.

10. The method as in claim 8, wherein the detecting step includes:

utilizing deviations in a master image point spread function in detecting one of an edge of the mechanical fault and an edge of a sound track of a master film.

11. The method as in claim 1, further comprising the following step prior to the compressing step:

plotting spectrally and radiometrically the point values using correcting curves which at least one of compensate material parameters of the master image and aging processes of the master image and eliminate a blurred master image by correcting the point spread function.

12. The method as in claim 1, further comprising the steps of:

intermediately storing the scanning step point values and matching step point values; and including the scanning step point values and the matching step point values in a data header in a mass store.

13. A device for archiving a master image, comprising:

a transport device for the master image;

a radiation source for the master image;

a prefield sensor for determining a maximum resolution of the master image, the resolution being at least one of, geometric resolution, radiometric resolution, and spectral resolution, the pre-field sensor having a resolution that is a multiple of the maximum resolution of the master image;

control electronics for digitizing detected points of the master image and modifying resolutions of the optical device such that the master image is scanned at a resolution at least twice as high as the maximum resolution of the master image;

an optical device for scanning the master image;

means for compressing the digitized points of the master image; and a mass store.

\* \* \* \* \*